(12) United States Patent
Abdo et al.

(10) Patent No.: US 12,103,293 B2
(45) Date of Patent: Oct. 1, 2024

(54) THERMAL TRANSFER OF ACTIVE INK WITH DYNAMIC ENVIRONMENTAL DATA

(71) Applicant: Temptime Corporation, Morris Plains, NJ (US)

(72) Inventors: Mohannad Abdo, Clifton, NJ (US); Thaddeus Prusik, Stroudsburg, PA (US); Dene H. Taylor, New Hope, PA (US)

(73) Assignee: TEMPTIME CORPORATION, Morris Plains, NJ (US)

( * ) Notice: Subject to any disclaimer, the term of this patent is extended or adjusted under 35 U.S.C. 154(b) by 34 days.

(21) Appl. No.: 17/894,392

(22) Filed: Aug. 24, 2022

(65) Prior Publication Data

US 2022/0402239 A1 Dec. 22, 2022

Related U.S. Application Data (62) Division of application No. 16/439,247, filed on Jun. 12, 2019, now Pat. No. 11,426,974.

(60) Provisional application No. 62/684,400, filed on Jun. 13, 2018.

(51) Int. Cl.
| | | |
|---|---|---|
| *B05D 5/00* | (2006.01) | |
| *B32B 7/06* | (2019.01) | |
| *B32B 7/12* | (2006.01) | |
| *B32B 27/36* | (2006.01) | |
| *B41J 31/06* | (2006.01) | |
| *B41M 5/40* | (2006.01) | |
| *B41M 5/50* | (2006.01) | |

(52) U.S. Cl.
CPC ............ *B32B 7/06* (2013.01); *B05D 5/00* (2013.01); *B32B 7/12* (2013.01); *B32B 27/36* (2013.01); *B41J 31/06* (2013.01); *B41M 5/40* (2013.01); *B41M 5/502* (2013.01)

(58) Field of Classification Search
None
See application file for complete search history.

(56) References Cited

U.S. PATENT DOCUMENTS

| | | | | |
|---|---|---|---|---|
| 4,616,236 A | * | 10/1986 | Watanabe | H04N 1/508 400/240.3 |
| 4,778,729 A | | 10/1988 | Mizobuchi | |
| 4,983,446 A | * | 1/1991 | Taniguchi | B41M 5/395 428/335 |
| 5,639,540 A | * | 6/1997 | Imaeda | B41M 5/46 428/411.1 |
| 5,827,617 A | | 10/1998 | Krauter | |

(Continued)

FOREIGN PATENT DOCUMENTS

| | | |
|---|---|---|
| EP | 1 048 476 | 11/2000 |
| WO | 2019241431 | 12/2019 |

OTHER PUBLICATIONS

Search Report and Written Opinion dated Oct. 10, 2019 issued for International PCT Application No. PCT/US2019/036837.

*Primary Examiner* — Michael P. Rodriguez
(74) *Attorney, Agent, or Firm* — K&L Gates LLP (57) ABSTRACT

A thermal transfer ribbon includes a carrier layer, a release layer, and a thermally transferable ink layer. The ink layer includes an active ink having a chemistry that is configured, responsive to the occurrence of an environmental, physical or biological condition, to undergo a chemical or physical state change causing a change in the color state of the active ink.

16 Claims, 5 Drawing Sheets

(56) References Cited

U.S. PATENT DOCUMENTS

| | | | |
|---|---|---|---|
| 6,517,239 B1 * | 2/2003 | Roth | B41M 7/0072 |
| | | | 374/102 |
| 2013/0027495 A1 | 1/2013 | Savagian | |
| 2013/0215004 A1 | 8/2013 | Nordlinder | |
| 2016/0292486 A1 | 10/2016 | Prusik et al. | |
| 2019/0383649 A1 | 12/2019 | Abdo et al. | |

* cited by examiner

THERMAL TRANSFER OF ACTIVE INK WITH DYNAMIC ENVIRONMENTAL DATA

CROSS REFERENCE TO RELATED APPLICATIONS

The present application is a divisional of U.S. patent application Ser. No. 16/439,247 filed on Jun. 12, 2019, which claims the benefit of U.S. Provisional Patent Application No. 62/684,400 filed Jun. 13, 2018, the contents of which is hereby incorporated by reference in its entirety.

BACKGROUND

Printing systems include laser printers, thermal printers and dot matrix printers. Laser printers pass a laser beam over paper or a substrate. Inkjet printing involves a process of propelling droplets of ink onto paper or a substrate. Dot Matrix printers use a printer head that strikes an ink soaked ribbon, which then is pressed against paper or a substrate. Thermal transfer printing uses a heat-sensitive ribbon or thermal transfer ribbon and a thermal print head to apply the ink to the paper or substrate. Thermal transfer ribbons for printing black and colored images often include a support substrate, and ink coated layer, and a back coat. Thermal transfer ribbons are used in tag and label applications to image various bar codes, images, readable text, etc. High resolution thermal print heads enable printing of more complex designs.

SUMMARY

The present disclosure provides a new and innovative system, methods and apparatus for thermal transfer of active ink with dynamic environmental data. In an aspect of the present disclosure, a thermal transfer ribbon includes a carrier layer, a release layer, and a thermally transferable ink layer. The ink layer includes an active ink having a chemistry that is configured, responsive to the occurrence of an environmental, physical or biological condition, to undergo a chemical or physical state change causing a change in the color state of the active ink.

In another aspect of the present disclosure, which may be used in combination with any other aspect or combination of aspects listed herein, a method of manufacturing a thermal transfer ribbon includes providing a carrier, providing a coating material, coating the coating material to a top side of the carrier to form a back coating layer, providing a release material, coating the release material to a bottom side of the carrier to form a release layer and an ink layer, providing an ink material, and coating the release layer with the ink material to form an ink layer. The ink material includes an active ink that has a chemistry that is configured, responsive to the occurrence of an environmental, physical or biological condition, to undergo a chemical or physical state change causing a change in the color state of the active ink.

In another aspect of the present disclosure, which may be used in combination with any other aspect or combination of aspects listed herein, a sensor-augmented indicator includes a substrate and a symbol provided on the substrate from a thermal transfer ribbon. The symbol includes an active ink having a chemistry that is configured, responsive to the occurrence of an environmental, physical or biological condition, to undergo a chemical or physical state change causing a change in the color state of the active ink, thereby changing the color state of the indicator. The symbol provided on the substrate includes a portion of the release layer and the thermally transferable ink layer of the thermally transferable ink layer of the thermal transfer ribbon.

In another aspect of the present disclosure, which may be used in combination with any other aspect or combination of aspects listed herein, an article of manufacture includes a pharmaceutical, a biological, or food product, preferably a vaccine. The article of manufacture also includes a container holding the pharmaceutical, biological, or food product and a sensor-augmented indicator provided on or in the container. Preferably, the indicator is applied to an outside surface of the container.

In another aspect of the present disclosure, which may be used in combination with any other aspect or combination of aspects listed herein, a thermal transfer ribbon includes a carrier layer, a release layer, and a thermally transferable ink layer. The thermally transferable ink layer is provided in one or more ink regions that occupy less than half of the thermal transfer ribbon. The ink layer includes an active ink that has a chemistry that is configured, responsive to the occurrence of an environmental, physical or biological condition, to undergo a chemical or physical state change causing a change in the color state of the active ink.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Thermal transfer ribbons with active or dynamic ink and techniques for printing active indicators with thermal transfer ribbons are disclosed. Prior applications involving thermal printing have not addressed applying active ink through the thermal printing process for environmental monitoring. Instead, existing thermal printing processes often print static information that is not sensitive to environmental factors such as temperature, time, time-temperature product, freezing, nuclear radiation, toxic chemicals, or the like.

Some embodiments described in this disclosure provide a unique way of printing coded sensor information (either alone or with pre-printed static data) on a media or substrate. The preprinted data and coded sensor information may be combined in a single step, or the coded sensor information may be added dynamically to the preprinted data in a secondary step depending on the actual planned sensor usage.

Figure 1A:
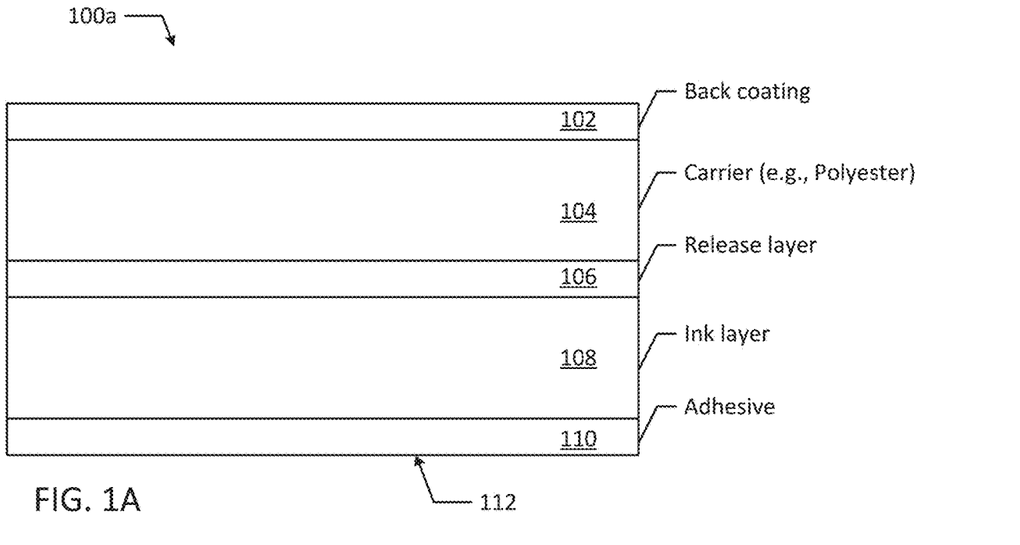
FIG. 1A is a block diagram of an example thermal transfer ribbon, according to an example embodiment of the present disclosure.
Figure 1B:
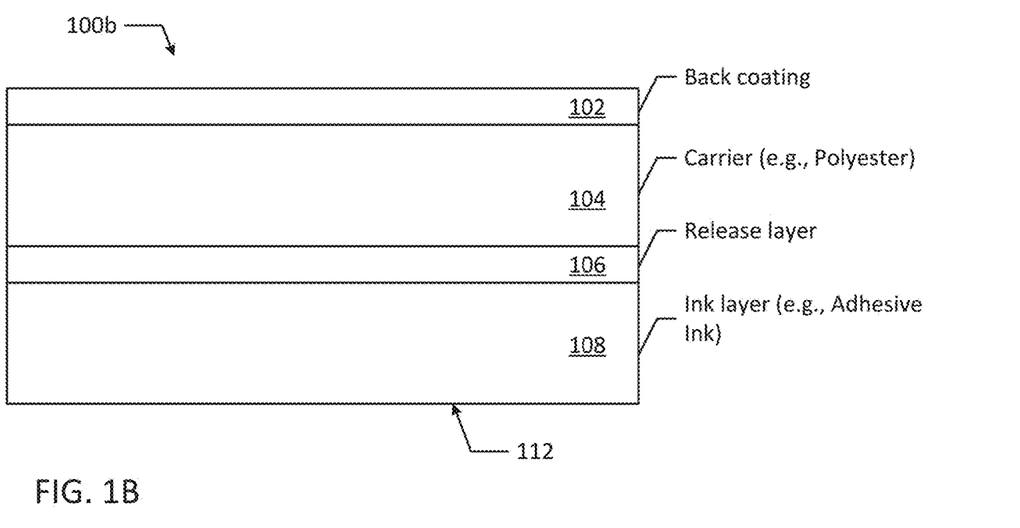
FIG. 1B is a block diagram of an example thermal transfer ribbon, according to an example embodiment of the present disclosure.

FIGS. 1A and 1B illustrate different embodiments of a thermal transfer ribbon. The transfer ribbons are used to transfer ink from a thin flexible material to a substrate to form an image or indicator. A thermal print head utilizes heat to activate adhesion of the ink to the substrate such that the ink breaks away from the ribbon and remains affixed to the substrate. In an example, the thermal transfer ribbons are adapted such that upon application of heat from a thermal print head, the ink layer fractures at the edge of a pattern. The thermal ribbons advantageously minimize or eliminate tearing beyond the pattern.

As illustrated in FIG. 1A, a thermal transfer ribbon 100a includes a back coating 102, a carrier 104 (e.g., polyester), a release layer 106, an ink layer 108, and an adhesive layer 110. FIG. 1B illustrates another example of a thermal transfer ribbon 100b that includes a back coating 102, a carrier 104 (e.g., polyester), a release layer 106, and an adhesive ink layer 108. The thermal transfer ribbon 100a, 100b (hereinafter referred to generally as thermal transfer ribbon 100) may include additives that advantageously improve dispersion, coating, and/or printing. Depending on the application, the thermal transfer ribbon 100 may be sized and shaped such that the consumption of active ink is minimized during printing. For example, the thermal transfer ribbon 100 may be selectively coated with active ink or the width of the thermal ribbon 100 may be changed to reduce the amount of active ink left behind on a used thermal transfer ribbon 100. The width of the thermal transfer ribbon 100 may be marginally larger than the desired printed image to reduce waste. Additional ink saving techniques are described in more detail below.

The back coating 102 or heat-resistant layer may include a heat-resistant binder(s) and a slip agent(s). The back coating is adapted to provide sufficient heat resistance to protect the carrier and/or substrate and prevent sticking between the printer head and ribbon 100. Additionally, the back coating is adapted to provide sufficient slip characteristics to the thermal transfer ribbon 100. In an example, the back coating may have a thickness of approximately 0.5 micrometers.

The back coating 102 may be prepared as a solution or dispersion in solvent or water and applied to the film or carrier 104 as a liquid using standard printing or coating techniques followed by drying and/or curing. In an example, back coating 102 may be prepared by adding slipping agent(s), surfactant(s), inorganic particle(s), organic particle(s), pigment(s) or the like to a binder resin. Example resins include cellulose resins such as ethyl cellulose, hydroxy ethyl cellulose, hydroxy propyl cellulose, methyl cellulose, cellulose acetate, cellulose acetate butyrate, nitrocellulose or the like; vinyl-type resins such as polyvinyl alcohol, polyvinyl acetate, polyvinyl butyral, polyvinyl acetal, polyvinyl pyrrolidone, acrylic resin, polyacrylamide, acrylonitrile-styrene copolymer or the like; polyester resin; polyurethane resin; silicone-modified urethane resin or fluorine-modified urethane resin or the like.

In other examples, the back coating 102 may be unnecessary if the carrier 104 provides sufficient heat resistance and/or slip properties to the thermal transfer ribbon 100. However, when using a carrier 104 with low heat resistance, it may be preferable to provide a heat-resistant layer or back coating 102 on a rear surface of the thermal transfer ribbon 100. Since the rear surface is contacted by the thermal print head, the back coating 102 advantageously improves a slipping property of the thermal print head and prevents the thermal print head from sticking to the thermal ribbon 100.

In an example, the carrier 104 is a polymer film, such as polyester. The polyester may be heat stabilized. In digital thermal transfer printing applications, the carrier 104 may be between 4.5 and 5.7 micrometers thick. Other carrier thicknesses may be used, for example, polyester that is 12, 17 or 24 micrometers thick, particularly if the printing is by step-and-repeat or rotary hot-stamping.

The thermal transfer ribbon 100 is adapted with release characteristics to ensure proper transfer of the ink from the image side surface 112 of the film or ribbon 100 (e.g., side of film positioned towards the substrate). For example, the transfer ribbon 100 may include a release layer 106 or release surface 206 (see FIG. 2) such that the bond between the carrier 104 and the ink layer 108 is weak enough to separate when subjected to heating from a thermal print head. An additional characteristic of the release layer is to hold the ink to the ribbon so that it is not removed from any actions or activities on the ribbon prior to the actual image generation step. In an example, the carrier 104 may be treated with corona, flame, or plasma to provide a bond between the carrier 104 and the ink layer 108 that is releasable in the printing process, yet holds the ink to the carrier through all stages up to that process. The active ink composition in the ink layer 108 may be matched to the carrier 104 such that an additional release layer 106 is unnecessary (e.g., for ribbons 100 used in hot-stamping).

In another example, the ribbon 100 may include a release layer 106 such as a thin coating (e.g., from about 0.5 micrometers to 3 micrometers or from about 0.5 micrometers to 1.5 micrometers) of an adhesive material with a melting point such that it loses cohesive strength when subjected to the heat from an active nib or print head. Release layer 106 may include a layer of heat-responsive wax or wax-like material that forms a strong bond with the ink. Heat from the thermal print head causes the heat-responsive wax to split allowing the ink to separate from the ribbon 100. The heat-responsive wax or wax-like material is particularly beneficial for thin films and ribbons 100. For example, a heat-responsive wax may provide strong adhesion at both the carrier 104 and ink layer 108 interfaces at room temperature (e.g., from about 20° C. to 25° C., preferably about of 23° C. or about 73.4° F.). Additionally, a heat-responsive wax may advantageously provide a room temperature bond and a high temperature (e.g., a temperature above approximately 120° C. or about 250° F., for example approximately 300° F.) release thereby allowing greater flexibility and broader compatibility in ink selections and/or ink formulations.

As mentioned above, in some examples, the release layer 106 may be avoided by using a film or carrier 104 with low adhesion properties. Processes using thicker carriers 104 (e.g., 12 to 24 microns) such as hot stamping in a step-and-repeat or rotary fashion, may perform better using a low adhesion carrier 104 rather than a heat-responsive wax as a release layer.

The ink layer 108 may include an ink, which may be referred to as a sensor dye that is applied to a thermal ribbon 100 in a first color state. The ink or sensor dye may comprise liquids, pastes, dyes, pigments, powders, polymers, etc. The ink layer 108 may be applied to the carrier 104 or release layer 106 with a rod coater, a gravure coater, or with a precision coating device, such as a slot coater, a microgravure coater, a curtain coater or the like. Initially, the ink layer 108 may have little to no color at all and then the color or characteristics of the ink layer may change after being exposed to an environmental condition (e.g., time, temperature, etc.). The thickness of the ink layer 108 may depend on the printing application and type of ink used. For example, continuous conductive metal inks may be 50 to 350 nm thick. Visual inks may be 1 to 4 micrometers thick. Opacifying graphic inks may be up to 10 micrometers thick. Inks other than time-temperature indictors may also be used. For example, the ink may be a spot or process color for graphics printing, the ink may include a conductor or insulator for electronics printing, etc., especially in concert with a temperature responsive ink.

In an example, the ink layer may be approximately 2 to 50 micrometers thick. For example, diacetylene active inks layers may be up to 25 micrometers thick. Additionally SCC inks may be up to 50 micrometers thick or more.

In an example, the active ink in the ink layer 108 may be a dispersion of pigments in nitrocellulose, which is capable of being digital thermal transfer printable. In another example, the active ink in the ink layer 108 may be a dispersion of pigments in acrylic resin. In other examples, the active ink may be incorporated into a synthetic resin composition to form ink layer 108. The active ink may include an indicator such as a diacetylene monomer pigment, a matched pair of a leuco dye precursor and a leuco dye developer, free or encapsulated thermochromic liquid crystal composition, a wax or wax-like light scattering particle, or any other thermochromic material. For example, the active ink may be an indicator such as a diacetylene monomer pigment, a matched pair of a leuco dye precursor and a leuco dye developer, free or encapsulated thermochromic liquid crystal composition, a wax or wax-like light scattering particle, or any other thermochromic material dispersed in acrylic resin. The ink layer 108 may include a high content of reactive or dynamic components (e.g., active ink) to allow for thinner ink layers 108, which may advantageously facilitate faster heat transfer and printing. Ink layers 108 with high heat transfer rates may also advantageously facilitate thermal transfer ribbons 100 with thicker ink layers 108 allowing more dynamic ink to be applied to the substrate.

The adhesive layer 110 includes a heat activated adhesive. For example, the adhesive layer 110 may transform from a first state (e.g., a hard non-tacky material at ambient temperatures) to a second state (e.g., a soft, conformable and tacky material) when heated. In an example, the adhesive may be incorporated into the ink layer to form an adhesive ink layer 108 (see FIG. 1B) with thermal adhesive properties. In an example, the thermal adhesive may be a thermoplastic. Additionally, the adhesive may be selected based on the printing substrate as some adhesives may not bond well to certain substrates. For example, an adhesive may be specifically formulated or selected to bond to specific substrates (e.g., polyethylene, paper, printable polyethylene terephthalate ("PET"), oriented polypropylene ("OPP"), etc.).

For an adhesive ink, the ink layer 108 may also function as the ink binder or part of the ink binder that aids in binding the ink to the substrate. In other examples, the adhesive layer 108 may be applied separately over the ink layer 108 (see FIG. 1A) to form a thin continuous layer on the image side surface 112 of the ribbon 100. Active ink or pigment dispersed in an adhesive binder to form an adhesive ink layer 108 may advantageously allow thinner thermal ribbons 100 with the same printing quality as thicker thermal ribbons 100, and also eliminate the separate process step of applying the adhesive 110 over the non-adhesive ink 108.

Example adhesives may be solvent based (e.g., Joncryl® 682), aqueous emulsion based (e.g., Joncryl® 538a), and/or water soluble, or a combination thereof.

During a thermal printing process, heat from a thermal print head passes through the carrier 104 and the ink layer 108. Under the same process conditions (e.g., same print head, same temperature, same coating and carrier properties), less heat passes through a thick ink layer 108 than a thin ink layer 108. Thus, the adhesive in either the adhesive layer 110 or the adhesive ink layer 108 may be selected based on process parameters. For thicker inks, adhesives with lower activation temperatures should be selected to ensure proper ink adhesion to the substrate.

In an example, especially for active inks (e.g., time-temperature indicators), the adhesive should be configured such that it has negligible influence of the inks color or appearance when printed. For example, the adhesive (e.g., adhesive layer 110) may be colorless or barely perceptible. Adhesives for use with visual indicating inks preferable have little to no influence on the development of the indicator. Similarly, the release layer 106 is preferably adapted to have little to no interference with the development of the indicator.

For example, both the release layer 106 and/or the adhesive (e.g., adhesive layer 110) are configured such that they neither advance nor retard the development of the active ink.

Packaging, labels and articles where the temperature indicator is applied at the centralized production facility, require that the whole package, label or article must be maintained in a temperature controlled environment through the distribution chain to the point of use, which is where the temperature indicator serves is intended purpose of protecting the perishable material. The cost of maintaining the cold chain when the indicator is active but not useful, is high, and inconvenient. The thermal transfer ribbons 100 of FIGS. 1A and 1B advantageously allow dynamic indicators (e.g., time-temperature indicators) to be printed at a point of use instead of in a centralized production facility. For example, dynamic indicators may be printed at a pharma packaging plant, a food packaging plant, etc. The printing process may be incorporated into a product production line such that the product is assembled and/or packaged with the printed indicator.

The active ink, dynamic ink or sensor dye chemistry may be employed where the sensed property is an environmental, physical, or biological property. A specified condition of the sensed property causes activation of a chemical or physical state change resulting in a change in the color state of the sensor dye. For example, if the thermal transfer ribbon is used to print a one-dimensional or two-dimensional barcode, the change in the color state results in sensor digital information being revealed in the pattern of sensor dye modules within the sensor-augmented barcode. Example barcodes include a Data Matrix, QR Code, Aztec Code, MaxiCode, PDF417, Dot Code symbologies, and the like.

Examples of environmental sensors include temperature monitors, measuring either cumulative heat exposure or passing beyond a set high or low temperature threshold value(s); time, time-temperature product, nuclear radiation exposure monitors; gas or humidity exposure monitors each passing above a cumulative exposure threshold or an instantaneous threshold value; as well as light, such as ultraviolet ("UV") exposure. Examples of medical sensors include recording patient thermometers; threshold assays measuring levels to biological toxins such as aflatoxin or botulism toxin; and includes colorimetric immunoassays for sensing of the presence of biological agents such as prions or biological organisms such as infectious bacteria. Indicators may also be used for product authenticity and anti-counterfeiting.

In an embodiment, the dynamic ink may be sensitive to an environmental factor such as temperature, time, time and temperature, freezing, radiation, toxic chemicals, or a combination of such factors, or the like. In an embodiment, the ink may be a thermochromic ink. For example, the dynamic ink may be a water-based irreversible thermochromic ink designed to change permanently from white to black at 40° C. Additionally, the thermochromic ink may be reversible. For example, the reversible thermochromic ink may be a liquid crystal ink or a leuco dye ink (examples include QCR Solutions Reversible Thermochromic Inks and H.W. Sands Corporation inks). In other embodiments, the ink may be a photochromic ink, which may be either reversible or irreversible. For example, the dynamic ink may change states based upon exposure to UV light. Additionally, the ink may be an ink sensitive to time and temperature (an example includes the OnVu indicator). The dynamic ink may change from a darker color to a lighter color, a lighter color to a darker color, may change levels of transparency or opacity, and/or may change levels of reflectivity or absorptivity, or may change any other suitable characteristic allowing changes of the indicator to be detectable to the naked eye or an indicator reader (e.g., camera, scanner, etc.). For example, a dynamic ink may change from a lighter color to a dark blue, which may be detectable to the naked eye or may be readable by a reader. Moreover, any suitable combination of colors may be used for the states of one or more dynamic inks.

In an embodiment, the dynamic ink may permanently change or irreversibly change in response to an environmental factor. For example, a certain chemical may experience thermal degradation when it is exposed to a certain temperature. A supplier may want to know if the chemical ever reached a temperature above 30° C. during transportation and storage. If the dynamic ink irreversibly changes, indicator may inform the supplier that the chemical was exposed to a temperature above 30° C. and that the contents of the container may have experienced thermal degradation.

In an embodiment, the thermal transfer ribbon 100 may be used to print an indicator to various products such as food product, pharmaceutical products, etc. In an embodiment, the printed active ink may change states responsive to at least one environmental change, such that the printed indicator is in either a first state or a second state.

Figure 2:
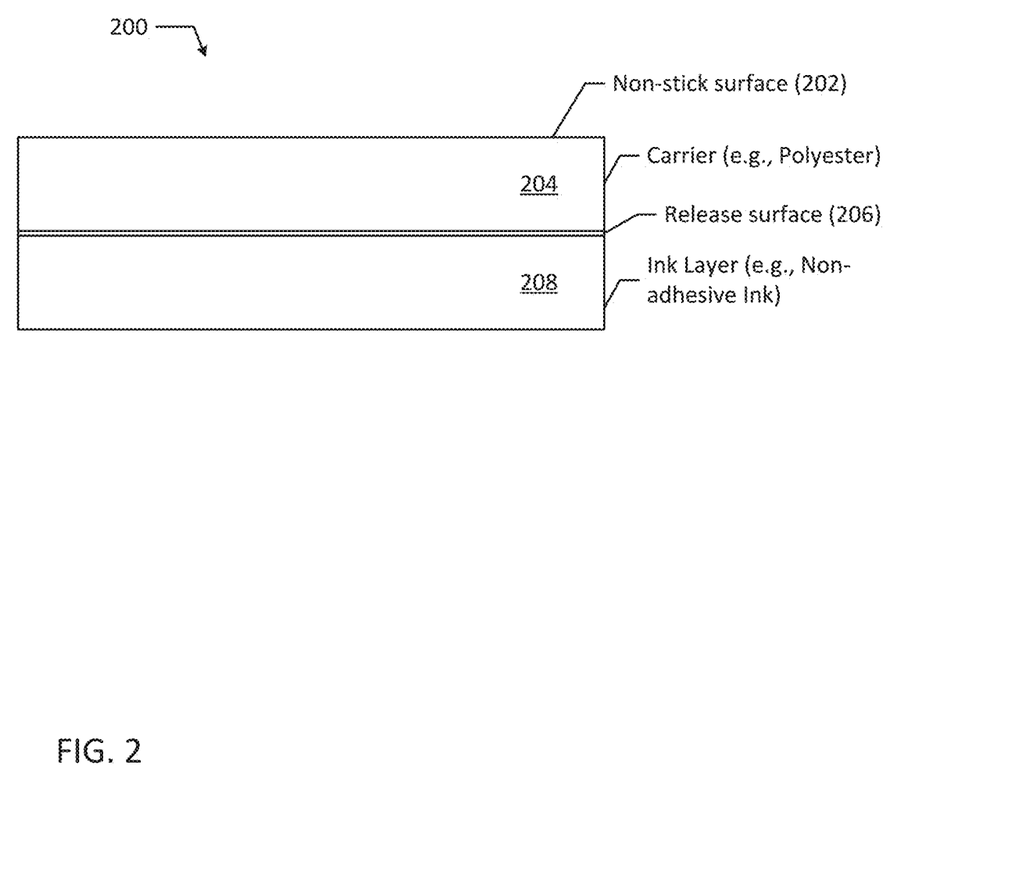
FIG. 2 is a block diagram of an example cold foil transfer ribbon, according to an example embodiment of the present disclosure.

As illustrated in FIG. 2, a cold foil type transfer ribbon 200 includes a carrier 204, such as a release polyester and a non-adhesive ink layer 208. The carrier 204 may have a non-stick surface 202 on the print head side and a release surface 206 between the carrier 204 and ink layer 208. The release polyester may have a thickness of approximately 5 to 12 micrometers, preferably between 5 to 6 micrometers and more preferably 4.8 micrometers and the non-adhesive ink layer 208 may have a thickness of approximately 2 to 50 micrometers, preferably 2 to 4 micrometers.

EXAMPLES

As illustrated in FIG. 1A, thermal transfer ribbon 100a may include a non-adhesive active ink in a nitrocellulose binder. Nitrocellulose is a binder derived from a natural source. For example, ribbon 100a includes a blank precoated IIMAK thermal transfer ribbon, comprising the carrier film 104, back coating 102 and release layer 106. The ink layer 108 may include an active ink comprising diacetylene monomer powder dispersed in nitrocellulose resin. The adhesive layer 110 may include Joncryl® 682 solution in solvent, Joncryl® 538A emulsion, or a Michelman adhesive emulsion. In an example, the release coating or release layer 106 of a blank pre-coated ribbon may be -replaced or coated with a supplemental release layer 106 that is compatible with the ink layer 108.

Another example of a ribbon 100a may include a non-adhesive active ink with a synthetic binder. For example, thermal transfer ribbon 100a may include an IIMAK blank precoated ribbon as the combined carrier 104, backcoating 102 and release coating 106. The ink layer 108 may include a diacetylene monomer powder and/or acrylic resins. The adhesive layer 110 may include Joncryl® 682 solution in solvent, Joncryl® 538A emulsion, a Michelman adhesive emulsion, or the like. By using an adhesive ink layer, resins may be used that are inert towards the development of the active inks used in the ink layer 108.

As illustrated in FIG. 1B, thermal transfer ribbon 100a may include an adhesive active ink based on a solvent. For example, thermal transfer ribbon 100b may include an IIMAK precoated blank ribbon as the combined carrier 104, back coating 102 and release coating 106. The ink layer 108 may include a diacetylene monomer powder and/or a resin with an appropriate glass transition point or softening temperature For example, the adhesive ink layer 108 may include Joncryl® 682 and a non-interacting solvent. The adhesive ink layer 108 may also include carnauba wax, candelilla wax, hydrocarbon wax, or a combination thereof. Both carnauba wax and candelilla wax have adhesive properties that are imparted to the ink layer 108. Other waxes or additives may be used that have sufficient adhesive properties and melting points.

Another example of a ribbon 100b may include an adhesive active ink based on emulsions. For example, thermal transfer ribbon 100a may include an IIMAK precoated blank ribbon as the combined carrier 104, back coating 102, and release coating 106. The ink layer 108 may include a diacetylene monomer powder and a resin emulsion. The resin emulsion may be formed from Joncryl® emulsion 538A and Carnauba wax emulsion Actega product Aquacer 2650.

Ribbon/Ink Saver Printing

The print head may be raised and lowered so that the print head is only in contact with ribbon 100 for the time (and distance) to provide a satisfactory print. By selectively raising and lowering the print head at predetermined intervals, less of the ribbon 100 may be used during print operations allowing more print operations per ribbon 100.

Figure 3:
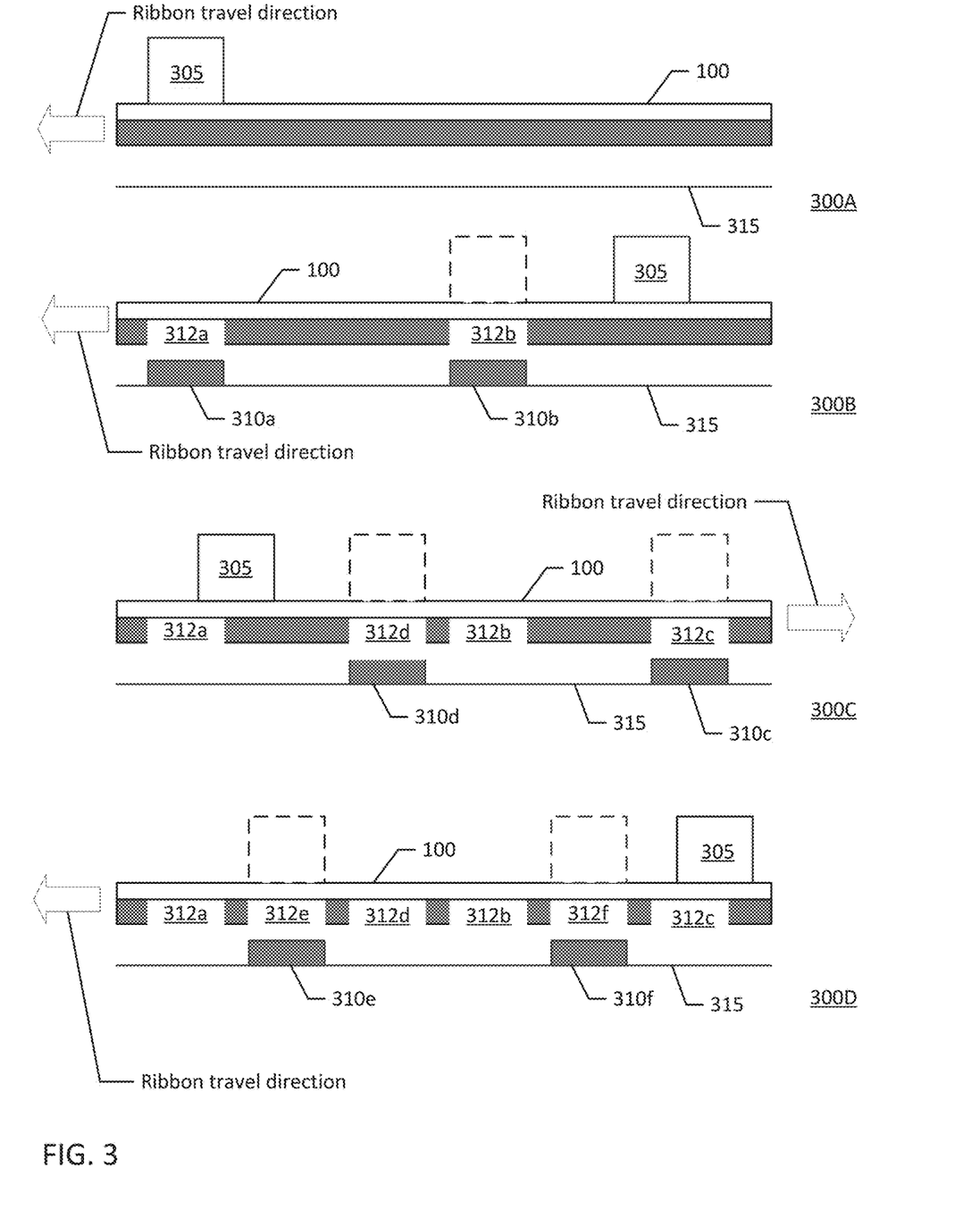
FIG. 3 is a block diagram of an example printing process, according to an example embodiment of the present disclosure.

FIG. 3 illustrates an example printing process at various stages or print actions 300A to 300D. For example, first and second print actions resulting in a first printed indicator 310a and a second printed indicator 310b are illustrated at stages 300A and 300B. For example, a first print action includes applying heat to the thermal transfer ribbon 100 via print head 305. As the print head 305 is pressed against the transfer ribbon 100 and into substrate 315, a temperature indicator 310a is printed on substrate 315. The ribbon is advanced along the travel direction (e.g., print head 305 may be stationary) and the print head may press ribbon 100 into substrate 315 again to form a second temperature indicator 310b. After a print operation, the ribbon 100 may include a cavity where ink has been thermally applied to the substrate 315. For example, indicators 310a, 310b correspond to cavities 312a, 312c respectively. The printing actions may be selectively spaced along the ribbon 100 to allow portions of the ribbon 100 neighboring a print action to properly cool before that portion of ribbon is used for printing.

For example, as illustrated in FIG. 3, the print head 305 may utilize a "print, space, space" approach that skips two print regions on the ribbon per print to allow sufficient ribbon space between each print action. As illustrated in stage 300C, after reaching the end of ribbon 100, the ribbon 100 may be run in the reverse direction to complete two additional printing operations or actions thereby printing indicator 310c and 310d and leaving respective cavities 312c and 312d on ribbon 100. A controller may coordinate print locations such that the indicator 310c is printed in one of the space regions from the first pass (e.g., the last space in the first pass is where the printing starts for second pass in the reverse direction).

Again as illustrated at stage 300D, after reaching the end of ribbon 100, the ribbon 100 may run in the reverse direction (e.g., to the left) to complete two additional printing operations or actions thereby printing indicator 310e and 310f and leaving respective cavities 312e and 312f on ribbon 100. A controller may coordinate print locations such that the indicator 310e is printed in the last remaining space region (e.g., between cavity 312a and 312d) from the first pass and second pass. It should be appreciated that other printing patterns and/or controls may be used. For example, the printer may utilize a "print, space, print, space" pattern. In other examples, the ribbon may me moved transversely (e.g., into and out of the page) for subsequent printing operations to utilize additional dynamic or active ink from the ribbon 100.

The print head 305 in FIG. 3 may be a near edge print head. For example, indicators may be printed from the thermal transfer ribbon using a thermal transfer printer with near edge print heads for high-speed applications. For high-speed applications, the transfer ribbon 100 may include higher percentages of reactive components in the ink layer such that the ink later is thinner allowing heat to transfer through the ribbon more rapidly. In other examples, the ribbon may include an adhesive ink layer in a pattern matching the intended pattern on the product, that has been formed by die cutting a solid coating of indicating ink on a separate carrier followed by transfer to the release coated carrier 104. This construction separates the forming of the desired ink pattern from the transfer process, which facilitates high-speed transfer. This also improves start and end edge quality of the transfer printed ink, which typically are degraded at high speed. In other examples, multiple print heads 305 may act on a single ribbon 100. For example, indicators 310a-f may be printed by one or more print heads 305. As discussed in more detail below (with respect to FIGS. 4A to 4C), ribbons 100 with multiple bands of different inks or multiple inks within a single band, different print heads 305 may be configured to print specific inks placed on the ribbon 100.

Selective Ink Coating

In some examples, the active ink layer may be the most costly component in the manufacturing process for thermal transfer ribbons 100. Typically, thermal transfer printing from a ribbon does not use all of the ink on the ribbon 100. The ribbons 100 may be selectively coated to help minimize waste of active or dynamic inks.

Figure 4A:
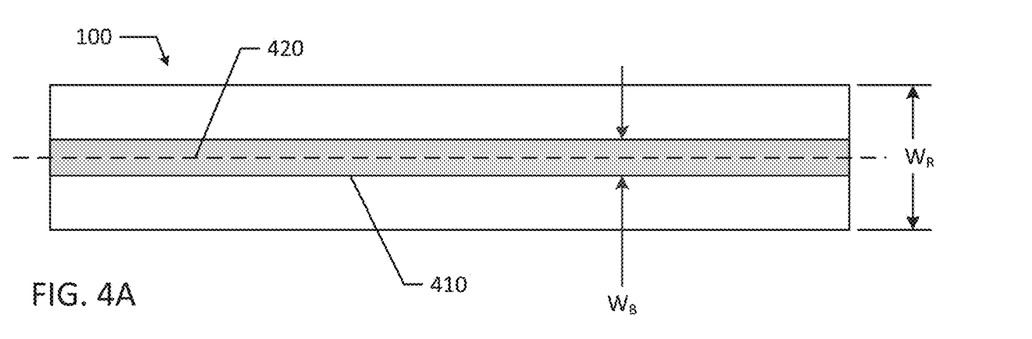
FIGS. 4A, 4B, and 4C are block diagrams of example thermal transfer ribbons with selectively applied layers of active ink.

For example, as illustrated in FIG. 4A, a thermal transfer ribbon 100 may have a ribbon width (WR) from approximately 12 mm to 110 mm, preferably from 12.7 mm to 24.44 mm, and more preferably about 17 mm, but may be used to print an indicator that is typically smaller than the ribbon width (e.g., from about 1.0 mm$^2$ to 20 mm$^2$ or from about 3.5 mm$^2$ to 4.5 mm$^2$). To reduce waste, the ribbon 100 may be selectively coated with active ink in a single band 410 that has band width (WB) that is less than the width (WR) of the ribbon 100. As shown in FIG. 4A, the band 410 of active ink is coated along and spaced evenly about a centerline 420 of the thermal transfer ribbon 100 to reduce waste during the printing process.

Applying a band 410 of active ink to ribbon 100 may advantageously reduce consumption or waste of active ink for common thermal ribbon sizes. For example, some commercial thermal ribbon printers may be configured to use a 17 mm wide thermal ribbon. By selectively coating the ribbon with a strip or band 410 of active ink, smaller printing operations may be achieved without wasting ink and while ensuring the thermal transfer ribbon 100 is accurately handled in the printer. In another example, multiple bands 410 or lanes may be coated on the thermal transfer ribbon 100. For example, by coating the ribbon 100 with multiple bands 410, the ribbon may be advanced across the print head multiple times (e.g., advanced across print head in a first direction to use first band then advanced across print head in second direction to use second band) to further reduce waste and cost, for example, by providing two lengths of active ink on a single carrier 104. The ribbon 100 may include multiple bands 410 of different inks (e.g., static ink or active ink). The static ink may be used to print an image such as barcode. Additionally the static ink may be a reference ink, such as a color calibration ink that is used to calibrate the active ink. Specifically, the reference ink may calibrate a reader when reading a sensor-augmented. Additionally, each of the multiple bands 410 may include different active inks. For example, the ribbon 100 may include a first band 410 of a first active ink and a second band 410 of a second active ink. A band 410 may also include multiple inks within the same band. For example, a single band 410 may include a static ink (e.g., reference ink) and an active ink. Additionally, a single band 410 may include multiple active inks within the same band 410.

Figure 4B:
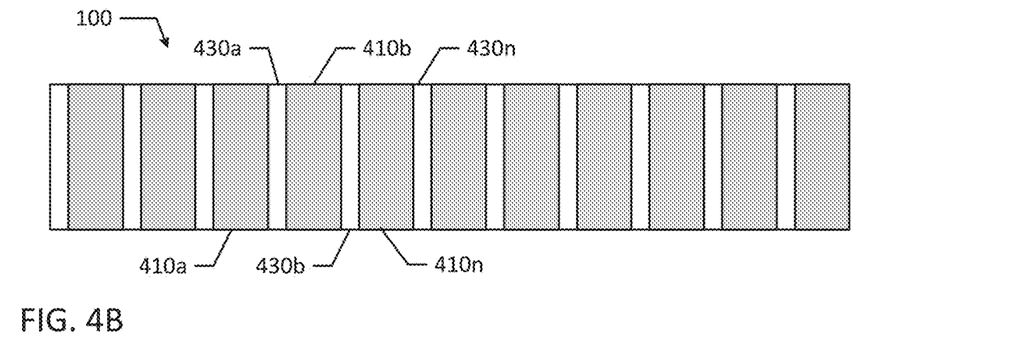

FIG. 4B illustrates another coating technique where the active ink is selectively coated to reduce waste. For example, during printing, heat from the thermal print head 305 may degrade neighboring sections of the ribbon 100. The heat applied by the thermal print head 305 may degrade one or more layers of the ribbon 100 such that the next print action is spaced a predetermined distance along the ribbon to ensure that the subsequent print action uses a fresh section of ribbon 100 that was unaffected by the previous print action. Based on the predetermined length of "affected" ribbon, active ink may be selectively coated on the ribbon avoiding these predetermined affected areas (e.g., suspected affected areas 430a, 430b, 430n etc.) thereby reducing waste. For example, the ink may be applied to the ribbon 100 in bands 410a, 410b, 410n, etc. to save ink that would otherwise be coated on the ribbon 100 in an affected area and thus rendered unusable during a printing option. As mentioned above, different bands 410 may comprise different active inks. Additionally, a band 410 may include multiple active inks such that band 410a includes a first active ink at a bottom portion and a second active ink at a top portion or the band. Similarly, a band (e.g., band 410b) may include a first active ink occupying the left half of the band and a second active ink occupying the right half of the band. In other examples, more than two active inks may be placed on the ribbon 100 or within a single band 410. Similarly, both static and active inks may occupy the same band 410.

Figure 4C:
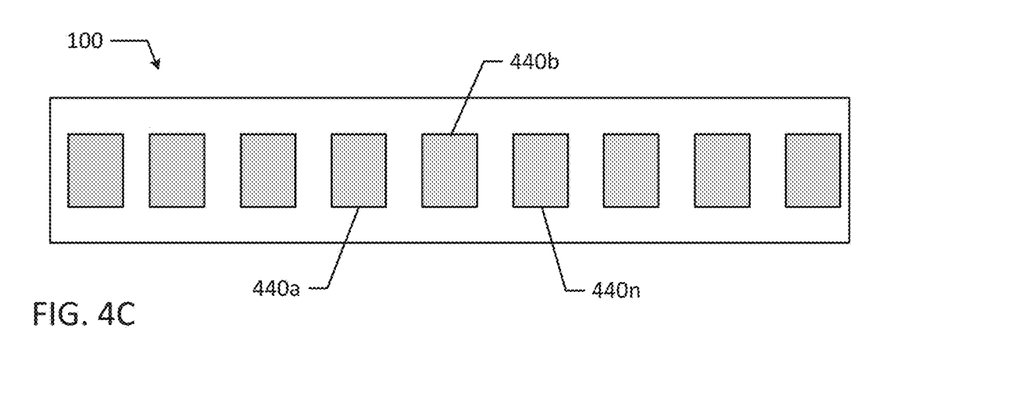

FIG. 4C illustrates another coating technique combining ink saving techniques from both FIGS. 4A and 4B. For example, the ribbon may be selectively coated with ink regions 440a, 440b, 440n that are sized and shaped to reduce waste during the printing process. It should be appreciated that other ink coating patterns and/or designs may be used to reduce ink waste.

Other Transfer Ribbon Applications

It should be appreciated that the thermal transfer ribbons described herein may be used for hot stamp printing or cold transfer. For example, the ribbon may be a hot stamp ribbon that includes an adhesive active ink layer that can be printed by step and repeat or rotary hot stamp machines. As discussed above, similar to thermal transfer printing, the advancing step in the ribbon may be controlled to ensure that subsequent print actions are fully formed and do not match the step between print positions on the substrate or between articles being printed to conserve the active ink.

For cold transfer ribbons, the ribbon may include a carrier web comprising an active ink suitable for adhesive transfer printing at room temperature (e.g., in a laminator). In cold transfer ribbons, adhesive may be printed on the substrate, the adhesive may be printed on the active ink, the adhesive may be pressure sensitive, and/or the adhesive may be reactive and cure after it is applied. The active ink may include diacetylene monomer or may be based on melting for an irreversible response.

Experimental Results

In an example, a thermal transfer ribbon was prepared by coating an IIMAK blank ribbon comprised of a 4.5 micrometer thick polyester film, a heat resistant back coating and a release coating, with an active ink formulation prepared from diacetylene monomer pigments dispersed in a solution of nitrocellulose in a mixture of alcohols. This active ink is used to make commercial time temperature indicators with 14 day activity. The dispersion was coated onto the blank ribbon with a Meyer rod at the same thickness used for the commercial indicator, and air dried. This diacetylene active ink was printed with a thermal transfer printing system onto Avery Dennison Primax polypropylene label stock, and compared to vaccine vial monitor ("VVM") time-temperature indicators, which give visual warning of potentially damaging cumulative heat exposure to indicate to health workers whether a product (e.g., a vaccine) can be used. Critical to the quality of a vaccine is the cumulative exposure to temperature over time, measured by the Mean Kinetic Temperature ("MKT"). The VVM is a label containing a heat-sensitive material that is affixed to a vaccine vial by the drug manufacturer to allow for full-life heat monitoring. Since the time-temperature indicator and the vaccine move through the supply chain together, they are exposed to the same conditions and MKT. This allows the time-temperature indicator to give health workers an overview of the cumulative heat exposure of the vaccine and a clear indication when it has reached its time-temperature end point.

Figure 5A:
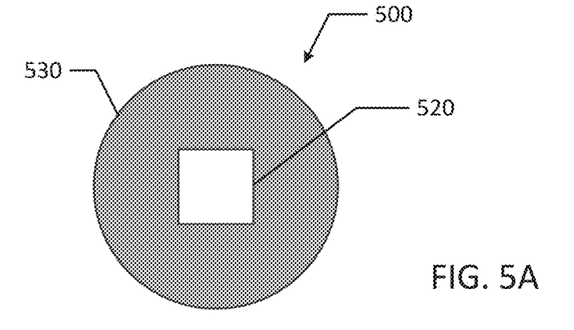
FIGS. 5A, 5B, 5C, and 5D are block diagrams of an example vaccine vial monitor at various cumulative exposure states.
Figure 5B:
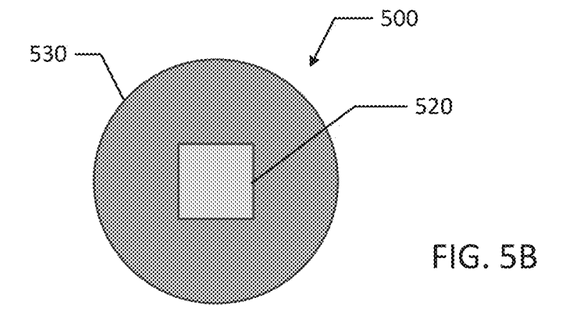
Figure 5C:
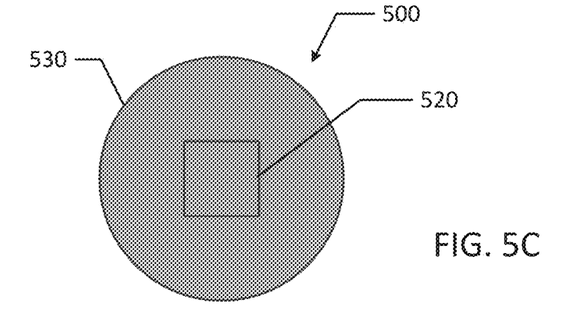
Figure 5D:
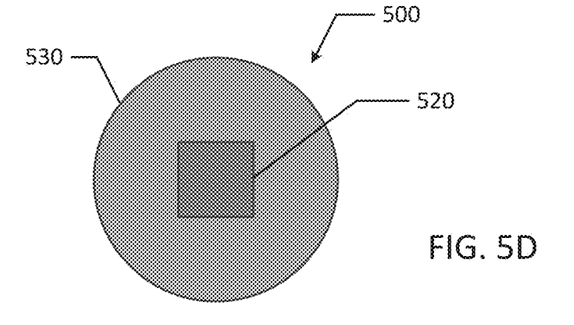

FIGS. 5A to 5D illustrate VVM 500 transitioning through a gradual and permanent color change from a first color state (e.g., not colored or lightly colored as illustrated in FIG. 5A) to a second color state (e.g., colored and dark as illustrated in FIG. 5D), the change from the first color state to the second color state shows the temperature history of the vaccine from the time the VVM 500 is affixed to the vaccine vial by the manufacturer—until the product is used. The inner square 520 of the VVM 500 is made of heat-sensitive material that is initially light in color and becomes darker when exposed to heat. The color change is faster at higher temperatures and slower at lower temperatures. At the end point, the inner square 520 is the same color as (e.g., as illustrated in FIG. 5C) or darker (as illustrated in FIG. 5D) than the outer circle 530 which is colored in a reference temperature so a user can quickly determine whether the product (e.g., vaccine) has exceeded its MKT threshold. Fore example, once the time-temperature indicator (e.g., square 520) is the same color (e.g., as illustrated in FIG. 5C) as the reference circle 530 or darker (as illustrated in FIG. 5D) than the reference circle 530, the product (e.g., vaccine) should be discarded. As mentioned above, ink for the outer circle 530 may be a reference ink, such as a color calibration ink with its color associated with a specific reference temperature. Additionally, the ink for the inner square 520 may be an active ink. Both the reference ink and the active ink may be positioned on the same ribbon 100 either in different bands 410 or within the same band 410.

The VVMs were compared against the thermal transfer prints. Both the VVMs and printed areas were placed in an oven at 100° C. for 3 minutes. The color change of the thermal transferred active ink areas and the VVMs appeared to be similar to the naked eye (note that no optical density ("OD") measurements were made). The experiment confirmed that functional indicators thermally printed with diacetylene inks performed similarly to other time-temperature indicators printed using other methods.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Also, it should be appreciated that the features of the dependent claims may be embodied in the systems, methods, and apparatus of each of the independent claims.

Many modifications to and other embodiments of the invention set forth herein will come to mind to one skilled in the art to which these inventions pertain, once having the benefit of the teachings in the foregoing descriptions and associated drawings. Therefore, it is understood that the inventions are not limited to the specific embodiments disclosed, and that modifications and other embodiments are intended to be included within the scope of the appended claims. Although specific terms are employed herein, they are used in a generic and descriptive sense only and not for purpose of limitation.

Additional Aspects of the Present Disclosure

Aspects of the subject matter described herein may be useful alone or in combination with one or more other aspect described herein. Without limiting the foregoing description, in an aspect of the present disclosure, a thermal transfer ribbon includes a carrier layer, a release layer, and a thermally transferable ink layer. The ink layer includes an active ink that has a chemistry that is configured, responsive to the occurrence of an environmental, physical or biological condition, to undergo a chemical or physical state change causing a change in the color state of the active ink.

In another aspect of the present disclosure, which may be used in combination with any other aspect or combination of aspects listed herein, the active ink is configured to undergo a continuous stage change between an initial state and an end state.

In another aspect of the present disclosure, which may be used in combination with any other aspect or combination of aspects listed herein, the environmental condition is selected from the group consisting of time, temperature, and time-temperature product. Preferably, the active ink continuously changes color state between the initial state and the end state when exposed to the environmental condition.

In another aspect of the present disclosure, which may be used in combination with any other aspect or combination of aspects listed herein, the active ink is initially in a first color state when unactivated and dynamically changes to a plurality of different color states within a range between the initial state and the end state before reaching the end state.

In another aspect of the present disclosure, which may be used in combination with any other aspect or combination of aspects listed herein, the active ink reaches an intermediate state between the initial state and the end state when a specified condition of a sensed property is beyond a threshold value. The threshold value is preferably a labeled product life.

In another aspect of the present disclosure, which may be used in combination with any other aspect or combination of aspects listed herein, the active ink dynamically changes to a plurality of different color states related to one of expended product life and remaining labeled product life.

In another aspect of the present disclosure, which may be used in combination with any other aspect or combination of aspects listed herein, the thermal transfer ribbon further includes a back coating layer. The back coating layer is thermally resistant.

In another aspect of the present disclosure, which may be used in combination with any other aspect or combination of aspects listed herein, the thermally transferable ink layer includes an adhesive.

In another aspect of the present disclosure, which may be used in combination with any other aspect or combination of aspects listed herein, the thermal transfer ribbon further includes an adhesive layer. The adhesive layer is adapted to bond the ink layer to a substrate when heat is applied to the thermal transfer ribbon.

In another aspect of the present disclosure, which may be used in combination with any other aspect or combination of aspects listed herein, thermal transfer ribbon has a length and a width. The thermally transferable ink layer is applied to a portion of the ribbon such that the ink layer width is less than the transfer ribbon width.

In another aspect of the present disclosure, which may be used in combination with any other aspect or combination of aspects listed herein, the thermally transferable ink layer is applied to the transfer ribbon in a pattern of ink regions. Each ink region in the pattern of ink regions is separated by a respective gap that is substantially absent of the active ink.

In another aspect of the present disclosure, which may be used in combination with any other aspect or combination of aspects listed herein, the carrier is polyester and the carrier has a thickness of from about 4 micrometers to about 6 micrometers, or from about 4.5 to about 5.5 micrometers.

In another aspect of the present disclosure, which may be used in combination with any other aspect or combination of aspects listed herein, the release layer has a thickness of from about 0.5 micrometers to about 1.5 micrometers, or about 1.0 micrometer.

In another aspect of the present disclosure, which may be used in combination with any other aspect or combination of aspects listed herein, the ink layer has a thickness of from about 2 micrometers to about 50 micrometers, or from about 5 to about 40 micrometers, from about 10 to 30 micrometers, or from about 15 to 20 micrometers, or from about 2 to 4 micrometers.

In another aspect of the present disclosure, which may be used in combination with any other aspect or combination of aspects listed herein, the environmental condition is selected from the group consisting of time, temperature, time-temperature product, light, humidity, gas vapor and nuclear radiation. Preferably, the active ink permanently changes color state when the environmental condition crosses a threshold value.

In another aspect of the present disclosure, which may be used in combination with any other aspect or combination of aspects listed herein, a method of manufacturing a thermal transfer ribbon includes providing a carrier, providing a coating material, coating the coating material to a top side of the carrier to form a back coating layer, providing at least one of an ink material and a release material, and coating at least one of the ink material and the release material to a bottom side of the carrier to form at least one of a release layer and an ink layer.

In another aspect of the present disclosure, which may be used in combination with any other aspect or combination of aspects listed herein, a method of manufacturing a thermal transfer ribbon includes providing a carrier, providing a coating material, coating the coating material to a top side of the carrier to form a back coating layer, providing a release material, coating the release material to a bottom side of the carrier to form a release layer and an ink layer, providing an ink material, and coating the release layer with the ink material to form an ink layer. The ink material includes an active ink that has a chemistry that is configured, responsive to the occurrence of an environmental, physical or biological condition, to undergo a chemical or physical state change causing a change in the color state of the active ink.

In another aspect of the present disclosure, which may be used in combination with any other aspect or combination of aspects listed herein, the method further includes providing an adhesive material, and coating the ink layer with the adhesive material to form an adhesive layer.

In another aspect of the present disclosure, which may be used in combination with any other aspect or combination of aspects listed herein, the carrier has a length and a width, and the ink material is applied to a portion of the release layer such that the ink layer width is less than the carrier width.

In another aspect of the present disclosure, which may be used in combination with any other aspect or combination of aspects listed herein, the ink layer width is less than half the width of the carrier.

In another aspect of the present disclosure, which may be used in combination with any other aspect or combination of aspects listed herein, the ink layer is coated on the release layer in a pattern of ink regions. Additionally, each ink region in the pattern of ink regions may be separated by a respective gap, and the gap may be substantially absent of the active ink.

In another aspect of the present disclosure, which may be used in combination with any other aspect or combination of aspects listed herein, the carrier is polyester and the carrier has a thickness of from about 4 micrometers to about 6 micrometers, or from about 4.5 to about 5.5 micrometers.

In another aspect of the present disclosure, which may be used in combination with any other aspect or combination of aspects listed herein, the release layer has a thickness of from about 0.5 micrometers to about 1.5 micrometers, or about 1.0 micrometer.

In another aspect of the present disclosure, which may be used in combination with any other aspect or combination of aspects listed herein, the ink layer has a thickness of from about 2 micrometers to about 50 micrometers, or from about 5 to about 40 micrometers, from about 10 to 30 micrometers, or from about 15 to 20 micrometers, or from about 2 to 4 micrometers.

In another aspect of the present disclosure, which may be used in combination with any other aspect or combination of aspects listed herein, the environmental condition is selected from the group consisting of time, temperature, time-temperature product, light, humidity, gas vapor and nuclear radiation. Preferably, the ink material permanently changes color state when the environmental condition crosses a threshold value.

In another aspect of the present disclosure, which may be used in combination with any other aspect or combination of aspects listed herein, the ink material is initially in a white or transparent color state when unactivated and changes to a different color state upon activation.

In another aspect of the present disclosure, which may be used in combination with any other aspect or combination of aspects listed herein, the ink material permanently changes color state when the specified condition of the sensed property is above or below a threshold value.

In another aspect of the present disclosure, which may be used in combination with any other aspect or combination of aspects listed herein, the active ink is configured to undergo a continuous stage change between an initial state and an end state.

In another aspect of the present disclosure, which may be used in combination with any other aspect or combination of aspects listed herein, a sensor-augmented indicator includes a substrate and a symbol provided on the substrate from a thermal transfer ribbon. The symbol includes an active ink that has a chemistry that is configured, responsive to the occurrence of an environmental, physical or biological condition, to undergo a chemical or physical state change causing a change in the color state of the active ink, thereby changing the color state of the indicator.

In another aspect of the present disclosure, which may be used in combination with any other aspect or combination of aspects listed herein, the symbol provided on the substrate includes a portion of the release layer and a portion of the thermally transferable ink layer of the thermal transfer ribbon.

In another aspect of the present disclosure, which may be used in combination with any other aspect or combination of aspects listed herein, the environmental condition is selected from the group consisting of time, temperature, time-temperature product, light, humidity, gas vapor and nuclear radiation. Preferably, the active ink permanently changes color state when the environmental condition crosses a threshold value.

In another aspect of the present disclosure, which may be used in combination with any other aspect or combination of aspects listed herein, the active ink is initially in a white or transparent color state when unactivated and changes to a different color state upon activation.

In another aspect of the present disclosure, which may be used in combination with any other aspect or combination of aspects listed herein, the active ink permanently changes color state when the specified condition of the sensed property is above or below a threshold value.

In another aspect of the present disclosure, which may be used in combination with any other aspect or combination of aspects listed herein, the active ink is configured to undergo a continuous stage change between an initial state and an end state.

In another aspect of the present disclosure, which may be used in combination with any other aspect or combination of aspects listed herein, the environmental condition is selected from the group consisting of time, temperature, and time-temperature product. Preferably, the active ink continuously changes color state between the initial state and the end state when exposed to the environmental condition.

In another aspect of the present disclosure, which may be used in combination with any other aspect or combination of aspects listed herein, an article of manufacture includes a pharmaceutical, a biological, or food product, preferably a vaccine. The article of manufacture also includes a container holding the pharmaceutical, biological, or food product and a sensor-augmented indicator provided on or in the container. Preferably, the indicator is applied to an outside surface of the container.

In another aspect of the present disclosure, which may be used in combination with any other aspect or combination of aspects listed herein, a thermal transfer ribbon includes a carrier layer, a release layer, and a thermally transferable ink layer. The thermally transferable ink layer is provided in one or more ink regions that occupy less than half of the thermal transfer ribbon. The ink layer includes an active ink that has a chemistry that is configured, responsive to the occurrence of an environmental, physical or biological condition, to undergo a chemical or physical state change causing a change in the color state of the active ink.

In another aspect of the present disclosure, which may be used in combination with any other aspect or combination of aspects listed herein, the one or more ink regions is a pattern of ink regions, and each ink region in the pattern of ink regions is separated by a respective gap. Additionally, the gap is substantially absent of the active ink.

In another aspect of the present disclosure, which may be used in combination with any other aspect or combination of aspects listed herein, each ink region in the pattern of ink regions has the same size and shape.

In another aspect of the present disclosure, which may be used in combination with any other aspect or combination of aspects listed herein, the one or more ink regions includes a strip of active ink forming the thermally transferable ink layer, which extends along a centerline of the thermal transfer ribbon, and the strip has a width that is less than half the width of the carrier layer.

In another aspect of the present disclosure, which may be used in combination with any other aspect or combination of aspects listed herein, the one or more ink regions includes another strip of active ink forming the thermally transferable ink layer.

The invention is claimed as follows:

1. A method of manufacturing a thermal transfer ribbon, the method comprising:
   providing a carrier having a longitudinal axis;
   providing a coating material;
   coating the coating material to a first side of the carrier to form a back coating layer;
   providing a release material;
   coating the release material to a second side of the carrier opposite the first side to form a release layer;
   providing an ink material, wherein the ink material comprises an active ink having a chemistry that is configured, responsive to the occurrence of an environmental, physical or biological condition, to undergo a chemical or physical state change causing a change in the color state of the active ink; and
   coating the release layer with the ink material to form an ink layer in a pattern of separate ink regions arranged longitudinally along the carrier, wherein each ink region in the pattern of ink regions is separated by a respective longitudinal gap from the next ink region, wherein the gap is substantially absent of the active ink, and wherein the ink material is applied to the release layer on the carrier so that the at least half of the carrier has no ink material coated on it.

2. The method of claim 1, further comprising:
providing an adhesive material; and
coating the ink layer with the adhesive material to form an adhesive layer.

3. The method of claim 1, wherein the carrier has a width perpendicular to the longitudinal axis, and wherein the ink material is applied to a portion of the release layer such that the ink layer width is less than the carrier width.

4. The method of claim 3, wherein the ink layer width is less than half the width of the carrier.

5. The method of claim 1, wherein the carrier is polyester and the carrier has a thickness of from about 4 micrometers to about 6 micrometers.

6. The method of claim 1, wherein the release layer has a thickness of from about 0.5 micrometers to about 1.5 micrometers.

7. The method of claim 1, wherein the ink layer has a thickness of from about 2 micrometers to about 50 micrometers.

8. The method of claim 1, wherein the environmental condition is selected from the group consisting of time, temperature, time-temperature product, light, humidity, gas vapor and nuclear radiation, and wherein the ink material permanently changes color state when the environmental condition crosses a threshold value.

9. The method of claim 1, wherein the ink material is initially in a white or transparent color state when unactivated and changes to a different color state upon activation.

10. The method of claim 1, wherein the ink material permanently changes color state when the specified condition of the sensed property is above or below a threshold value.

11. The method of claim 1, wherein the active ink is configured to undergo a continuous stage change between an initial state and an end state.

12. The method of claim 1, wherein the active ink comprises a diacetylene which changes color responsive to exposure to temperature over time.

13. The method of claim 1, wherein the ink material is applied to the release layer on the carrier so that the at least half of the length of the carrier has no ink material coated on it.

14. The method of claim 1, wherein each ink region in the pattern of ink regions has the same size and shape.

15. The method of claim 1, wherein the active ink is configured to remain in an unactivated state when the active ink is coated on the ribbon.

16. The method of claim 1, wherein the active ink is configured to undergo a permanent color state change responsive to a temperature exposure beyond a predetermined threshold value.

* * * * *